(12) United States Patent
Sun et al.

(10) Patent No.: US 8,625,480 B2
(45) Date of Patent: Jan. 7, 2014

(54) METHOD AND SYSTEM FOR A RELAY NODE TO ACCESS A NETWORK

(75) Inventors: Xiaoting Sun, Shenzhen (CN); Tao Gao, legal representative, Xi'an (CN); Ke Wang, Shanghai (CN); Yan Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 13/225,072

(22) Filed: Sep. 2, 2011

(65) Prior Publication Data

US 2011/0317617 A1    Dec. 29, 2011

Related U.S. Application Data

(63) Continuation of application No. PCT/CN2010/070709, filed on Feb. 23, 2010.

(30) Foreign Application Priority Data

Mar. 3, 2009    (CN) .......................... 2009 1 0119111

(51) Int. Cl.
   *H04B 7/14*    (2006.01)
(52) U.S. Cl.
   USPC .......................................... 370/315
(58) Field of Classification Search
   None
   See application file for complete search history.

(56) References Cited

U.S. PATENT DOCUMENTS

| 2004/0110484 | A1 | 6/2004 | Koshino et al. | |
|---|---|---|---|---|
| 2007/0149118 | A1 | 6/2007 | Kang et al. | |
| 2008/0045147 | A1 | 2/2008 | Okuda | |
| 2008/0108369 | A1 | 5/2008 | Visotsky et al. | |
| 2009/0221288 | A1 | 9/2009 | Zhang et al. | |
| 2009/0305671 | A1* | 12/2009 | Luft et al. ..................... | 455/411 |
| 2010/0103857 | A1* | 4/2010 | Ulupinar et al. .............. | 370/313 |
| 2010/0150103 | A1* | 6/2010 | Womack et al. .............. | 370/331 |
| 2011/0059736 | A1* | 3/2011 | Norrman et al. .............. | 455/424 |
| 2011/0222428 | A1* | 9/2011 | Charbit et al. ................ | 370/252 |
| 2011/0287776 | A1* | 11/2011 | Vujcic ......................... | 455/452.1 |

FOREIGN PATENT DOCUMENTS

| CN | 1505344 A | 6/2004 |
|---|---|---|
| CN | 101064901 A | 10/2007 |
| CN | 101123804 A | 2/2008 |
| CN | 101146337 A | 3/2008 |
| CN | 101291527 A | 10/2008 |
| CN | 101459938 | 6/2009 |

(Continued)

OTHER PUBLICATIONS

Chinese Patent No. 101827451, issued on Dec. 12, 2012, granted in corresponding Chinese Patent Application No. 200910119111.3.

(Continued)

*Primary Examiner* — Otis L Thompson, Jr.
(74) *Attorney, Agent, or Firm* — Brinks Gilson & Lione (57) ABSTRACT

A method and a system for a relay node to access a network are provided, and are related to the field of communications technology. The invention is disclosed in order to solve the problem that the RN cannot access the network directly in the prior art. The method for the RN to access the network includes: receiving, by a base station, a network access message including information for identifying the RN (101); enabling, according to the information for identifying the RN (102), the RN waiting for access to access the network. Through the method, the RN can access the network directly through the base station.

17 Claims, 8 Drawing Sheets

(56) References Cited

FOREIGN PATENT DOCUMENTS

| EP | 1775886 A1 | 4/2007 |
|---|---|---|
| EP | 1973274 A2 | 9/2008 |
| WO | WO 2007078150 A1 | 7/2007 |
| WO | WO 2009/099845 A2 | 8/2009 |
| WO | WO 2010/027821 A2 | 3/2010 |
| WO | WO 2010/027821 A3 | 3/2010 |

OTHER PUBLICATIONS

Office Action issued in corresponding Chinese Patent Application No. 200910119111.3, mailed Mar. 1, 2012.
Office Action issued in corresponding Chinese Patent Application No. 200910119111.3, mailed Sep. 14, 2011.
Written Opinion of the International Searching Authority issued in corresponding PCT Patent Application No. PCT/CN2010/070709, mailed May 27, 2010.
International Search Report issued in corresponding PCT Patent Application No. PCT/CN2010/070709, mailed May 27, 2010.
3$^{rd}$ Generation Partnership Project, "Technical Specification Group Radio Access Network; Evolved Universal Terrestrial Radio Access (E-UTRA) and Evolved Universal Terrestrial Radio Access Network (E-UTRAN); Overall Description" Stage 2 (Release 8). 3GPP TS 36.300, V8.7.0, Dec. 2008.
Extended European Search Report issued in corresponding European Patent Application No. 10748307.5, mailed Feb. 22, 2012.
Ericsson, "A Discussion on some Technology Components for LTE-Advanced" 6.2, TSG-RAN WG1 #53. Kansas City, Missouri, May 5-9, 2008. R1-082024.
Motorola, "Classification of Relays" 12, TSG-RAN WG1 #54. Jeju, South Korea, Aug. 18-22, 2008. R1-083223.
Qualcomm Europe, "Operation of Relays in LTE-A" 12, TSG-RAN WG1 #54. Jeju, South Korea, Aug. 18-22, 2008. R1-083191.
Extended European Search Report issued in corresponding European Patent Application No. 12188971.1, mailed Nov. 23, 2012.

\* cited by examiner

METHOD AND SYSTEM FOR A RELAY NODE TO ACCESS A NETWORK

CROSS-REFERENCE TO RELATED APPLICATIONS

This application is a continuation of International Application No. PCT/CN2010/070709, filed on Feb. 23, 2010, which claims priority to Chinese Patent Application No. 200910119111.3, filed on Mar. 3, 2009, both of which are hereby incorporated by reference in their entireties.

TECHNICAL FIELD

The present invention relates to the field of communications technologies, and in particular, to a technology for a relay node (RN) to access a network.

BACKGROUND

In the process of broadband and mobilization development of a network, the 3rd Generation Partnership Program (3GPP) organization proposes a Long Term Evolution (LTE) solution, that is, Evolved Universal Mobile Telecommunication System (UMTS) Territorial Radio Access Network (E-UTRAN) in a mobile access network and a System Architecture Evolution (SAE) solution, that is, Evolved Packet Core (EPC), in a mobile core network.

The E-UTRAN adopts a single layer structure including only an evolved base station (Node B, eNB), so as to simplify the network and reduce network delay. The structure actually approaches a typical Internet Protocol (IP) broadband network structure. A traditional cellular network is a star topology network centering on a base station and adopts centralized control, so a User Equipment (UE) directly access the network through the eNB in the current LTE protocol.

SUMMARY OF THE INVENTION

Embodiments of the present invention provide a method and system for an RN to access a network, an RN, and a device for an RN to access the network, so that when the RN needs to access the network, the RN can access the network through an eNB.

In one aspect, the present invention provides a method for an RN to access a network. The method includes: receiving, by a base station, a network access message including information for identifying the RN; and enabling, according to the information for identifying the RN, an RN waiting for access to access the network.

In another aspect, the present invention also provides a device for an RN to access a network. The device includes: a network access message receiving unit, configured to receive a network access message including information for identifying the RN; and an access unit, configured to enable, according to the information for identifying the RN, an RN waiting for access to access the network.

In yet another aspect, the present invention further provides a method for an RN to access a network. The method includes: receiving a network access message sent by an RN waiting for access, where the message includes information for identifying the RN; and sending the network access message including the information for identifying the RN to a base station.

In yet another aspect, the present invention further provides an RN, where the RN includes: a message receiving unit, configured to receive a network access message sent by an RN waiting for access, where the message includes information for identifying the RN; and a message sending unit, configured to send the network access message including the information for identifying the RN to a base station.

In yet another aspect, the present invention further provides a communication system, where the system includes: a base station, configured to receive a network access message including information for identifying the RN, and enable, according to the information for identifying the RN, an RN waiting for access to access the network; and the RN waiting for access, configured to send the network access message to the base station, where the network access message includes the information for identifying the RN.

According to the above mentioned solutions, the RN accesses the network through the network access message including the information for identifying the RN. The base station performs information interaction with a core network entity and the RN through the received network access message including the information for identifying the RN, so that when the RN needs to access the network, the RN can directly access the network through the base station.

DETAILED DESCRIPTION OF ILLUSTRATIVE EMBODIMENTS

A method and a device for an RN to access a network according to embodiments of the present invention are described in detail in the following with reference to the accompanying drawings.

In the embodiments of the present invention, an RN waiting for access may access the network through an eNB directly, or access the network through multiple RNs and then through an eNB. A situation that a UE is directly connected to a base station is called a single-hop, and a link between the UE and the base station is called a direct connection. A situation that the UE is connected to the base station through one RN is called a double-hop. A situation that the UE is connected to the base station through multiple (for example, three) RNs is called a multi-hop.

Figure 1A:
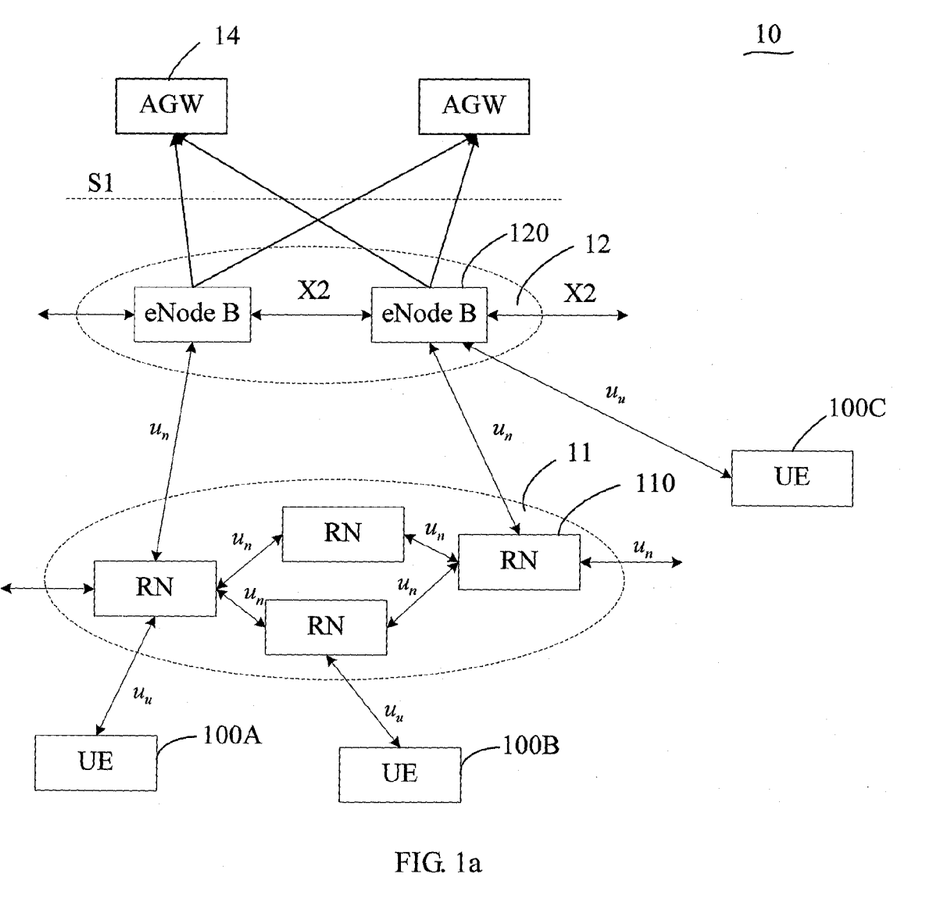
FIG. 1a is a simple schematic diagram of network architecture of an LTE according to an embodiment of the present invention.

An LTE is taken as an example. FIG. 1a is a simple schematic diagram of network architecture of an LTE according to an embodiment of the present invention. As shown in FIG. 1a, an LTE communication system 10 may include a relay layer 11, a transport layer 12 and an access gateway (AGW) 14.

The relay layer 11 may include one or more RNs 110 coupled through air interfaces. Similarly, the transport layer 12 may include one or more base stations 120 coupled with each other through optical fibers. Moreover, the base stations 120 may be connected to the AGWs 14 through optical fibers. In another embodiment of the present invention, the base station 120 and the AGW 14 may communicated with each other in an optical, electrical, or wireless manner. Multiple signals may be transmitted in the transport layer 12 through an optical path, and transmitted through the base station 120 to the AGW 14, the RN 110 or other base stations, or transmitted to a UE 100A, a UE 100B, or a UE 100C through the air interface. The multiple signals may be transmitted in the transport layer 11 through the air interface, and transmitted through the RN 110 to the base station 120, the UE 100A, the UE 100B, or the UE 100C, or other RNs.

The UE 100A, the UE 100B, and the UE 100C may access the network through the base station 120 or first through the RN 110 and then through the base station 120. For example, the UE 100A, the UE 100B, and the UE 100C may access the network through the same base station or RN or through different base stations or RNs.

The AGW 14 may be connected to a core network through optical fibers, and the core network may also connect to other networks, such as a Public Data Network (PDN), a Public Switched Telephone Network (PSTN), and an Integrated Service Digital Network (ISDN).

Furthermore, at least some RNs, for example, the RNs located in an edge of the relay layer 11, may be used to transmit data to other base stations or other RNs, where the data is applied to the relay layer 11. Similarly, at least some base stations, for example, the base stations located in an edge of the transport layer 12, may be used to transmit data to other base stations or other RNs, where the data is applied to the transport layer 12.

The LTE communication system 10 shown in FIG. 1a only displays four RNs 110, two base stations 120, and one AGW 14. The LTE communication system 10 may include any number of RNs 110, base stations 120, and AGWs 14. Moreover, when multiple base stations 120 correspond to multiple RNs 110 in a one-to-one manner, the multiple base stations 120 may be connected to one RN 110, or the multiple RNs 110 may be connected to one base station 120. Similarly, the LTE communication system 10 may include multiple AGWs 14, and the base station 120 may be connected to one or more AGWs 14.

In another embodiment of the present invention, the UE 100A and the UE 100B may communicate with the RN 110 through a $u_u$ interface, and the UE 100C may directly communicate with the base station 120 through a $u_n$ interface. As shown in FIG. 1a, a situation that the UE 100C is directly connected to the base station 120 is called a single-hop, and a link between the UE 100C and the base station 120 is called a direct connection. A situation that the UE 100A is connected to the base station 120 through one RN is called a double-hop. A situation that the UE 100B is connected to the base station 120 through multiple (for example, three) RNs is called a multi-hop.

The RN 110 may communicate with the base station 120 through the $u_n$ interface. The $u_u$ interface and the $u_n$ interface both are the air interfaces. The base station 120 may communicate with the AGW 14 through an S1 interface. For example, the base station 120 and the AGW 14 may be connected through optical fibers or in other manners. Definitely, these devices may also communicate with each other through other interfaces or user-defined interfaces, and the present invention is not limited thereto.

When the multi-hop exits, the RNs are connected with each other through $u_n$ interfaces or other interfaces. Definitely, the RNs may also communicate with each other through other interfaces or user-defined interfaces, and the present invention is not limited thereto.

A base layer transmission between the base stations 120 is IP transmission, and the base stations 120 are connected with each other through an X2 interface or other interface (for example, an S1 interface).

Figure 1B:
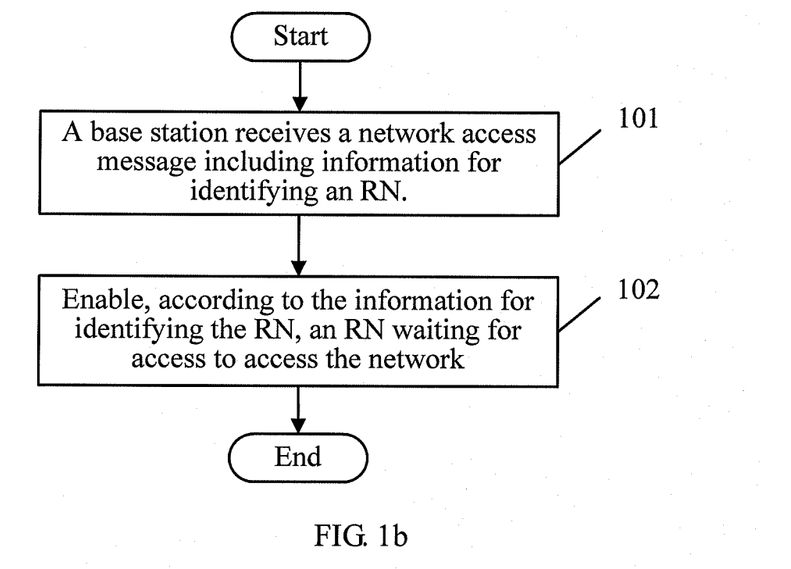
FIG. 1b is a flow chart of a method for an RN to access a network according to an embodiment of the present invention.

FIG. 1b shows a method for an RN to access a network according to an embodiment of the present invention. The method may be described as follows:

101: A base station receives a network access message including information for identifying the RN.

For example, in this embodiment, the network access message including the information for identifying the RN may be a random access request message dedicated to the RN or an initial signaling bearer connection establishment request message carrying RN identifier (ID) information.

For example, in an initial network access process of the RN, an eNB distinguishes the RN from a UE in two manners, and either manner may be selected to implement the distinguishing.

(1) RN adopts a random access preamble dedicated to the RN, where the preamble is distinguished from that of the UE. For example, the preamble is divided into two subsets, one subset is assigned to the UE, and the other is assigned to the RN.

Therefore, the network access information is the random access request message.

(2) The information for identifying the RN is included in the initial signaling bearer connection establishment request message, where the information for identifying the RN is an RN ID. For example, an optional tag bit may be added to identify that it is an RN rather than a UE to access the network initially.

102: Enable, according to the information for identifying the RN, an RN waiting for access to access the network.

According to the method and the device for the RN to access the network provided by the embodiments of the present invention, the RN accesses the network through the information for identifying the RN, where the information is included in the network access message. The base station performs information interaction with a core network entity and the RN through the received network access message, where the message includes the information for identifying the RN, so that when the RN needs to access the network, the RN can directly access the network through the base station.

Figure 2:
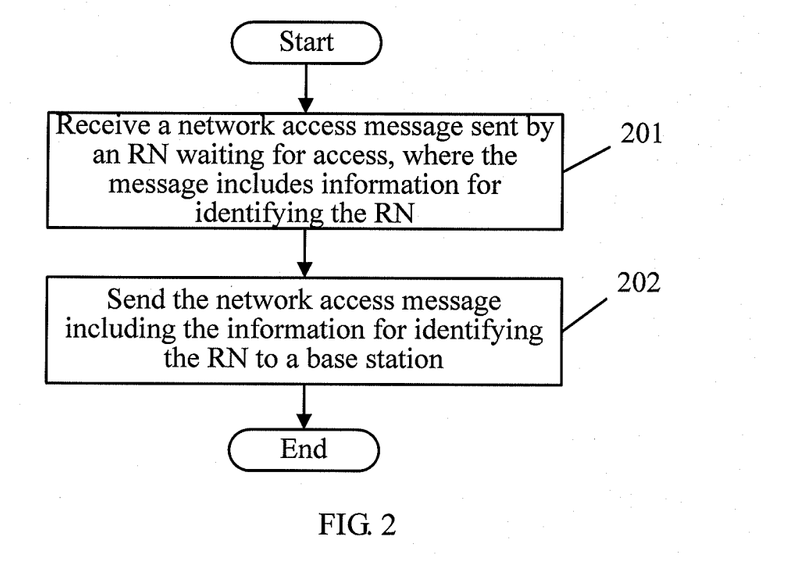
FIG. 2 is a flow chart of another method for an RN to access a network according to an embodiment of the present invention.

FIG. 2 shows another method for an RN to access a network according to an embodiment of the present invention. The method may be described as follows:

201: Receive a network access message sent by an RN waiting for access, where the message includes information for identifying the RN.

202: Sent the network access message, which includes the information for identifying the RN, to a base station.

To illustrate the present invention more clearly, the method for the RN to access the network, which is provided by the present invention, is described in the following through a specific access process.

Figure 3:
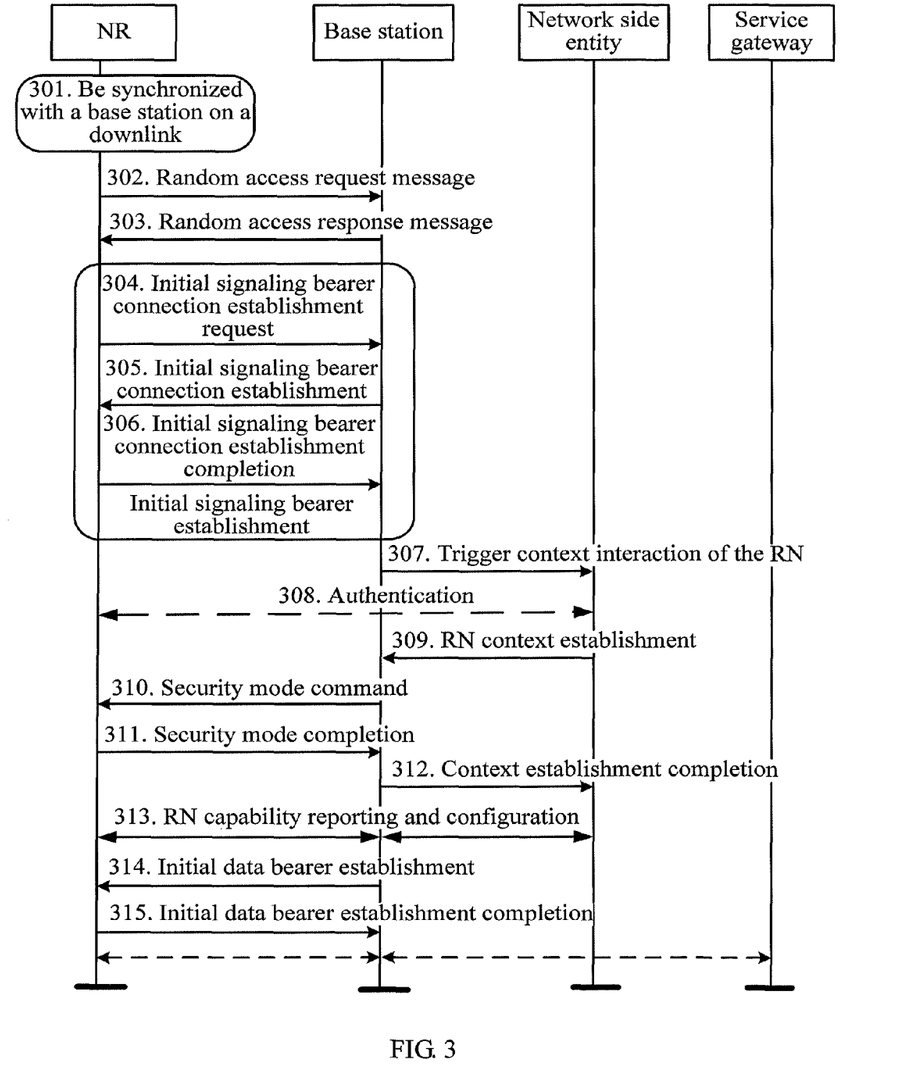
FIG. 3 is a flow chart of a method for an RN to access a network according to an embodiment of the present invention, where one RN directly accesses the network through a base station.

FIG. 3 shows a method for an RN to access a network according to an embodiment of the present invention. A process that one RN directly accesses the network through an eNB is taken as an example in the following.

The detailed implementation process that the RN directly accesses the network through the eNB is described as follows:

301: When the RN needs to access the network, the RN and the eNB complete downlink synchronization.

302: The RN sends a random access request message including a preamble to the eNB.

For example, if a preamble dedicated to the RN is assigned to the RN, the preamble is used. If a preamble dedicated to the RN is not assigned to the RN, the RN selects a group in preamble subsets, which is dedicated to the RN, in an internal cell, and then the RN sends the selected preamble to the eNB on a Physical Random Access Channel (PRACH) according to a PRACH location read from an eNB system broadcast.

303: After receiving the preamble from the RN, the eNB sends a random access response message to the RN as a response.

For example, the random access response message includes uplink grant (UL Grant), indication of an initial signaling bearer establishment request message, uplink timing advance (TA), and a Temporary Cell-Radio Network Temporary Identifier (TC-RNTI) assigned to the RN.

304: The RN sends an initial signaling bearer connection establishment request message to the eNB on UL grant resources indicated in the random access response message.

For example, the RN monitors a Physical Downlink Control Channel (PDCCH) within a window time to obtain downlink assignment (DL assignment) indication. The RN receives the random access response message on a physical downlink share channel (PDSCH) according to the DL assignment indication. After the RN receives the random access response message, the RN and the eNB are synchronized on an uplink. The initial signaling bearer connection establishment request message carries a TC-RNTI assigned by the eNB for the RN and a user ID of a non-access stratum (NAS).

In this embodiment, if the random access request message does not carry the preamble dedicated to the RN, the initial signaling bearer connection establishment request message may carry an RN ID bit, where the RN ID bit may be used for the eNB to distinguish whether the RN or the UE accesses the network initially.

305: After receiving the initial signaling bearer connection establishment request message from the RN, the eNB may establish a temporary routing table entry for the RN by using the TC-RNTI of the RN carried in the message and send an initial signaling bearer connection establishment message to the RN as a response.

306: After receiving the initial signaling bearer connection establishment message correctly, the RN upgrades the TC-RNTI to a Cell Radio Network Temporary ID (C-RNTI).

For example, the RN sends an initial signaling bearer connection establishment completion message to the eNB as a response. The initial signaling bearer connection establishment completion message carries a message provided for a core network entity.

For example, the core network entity may be a mobile management entity (MME) or other entities capable of completing information configuration at a network side.

307: After receiving the initial signaling bearer connection establishment completion message, the eNB updates the routing table entry of the RN correspondingly.

In this embodiment, the eNB also forwards an NAS message provided by the RN for the core network entity to the core network entity to trigger the RN to perform context interaction.

308: Security authentication is performed between the RN and the core network entity.

309: After the security authentication is completed, the core network entity sends an RN context establishment message to the eNB.

310: After receiving an RN context, the eNB stores a security context related to the RN, starts a security configuration process, and sends a security mode command to the RN.

311: After receiving the security mode command, the RN performs acknowledgment (Ack) and sends a security mode completion Ack to the eNB.

312: After receiving the security mode completion Ack of the RN, the eNB sends a context establishment completion message to the core network entity.

Figure 4:
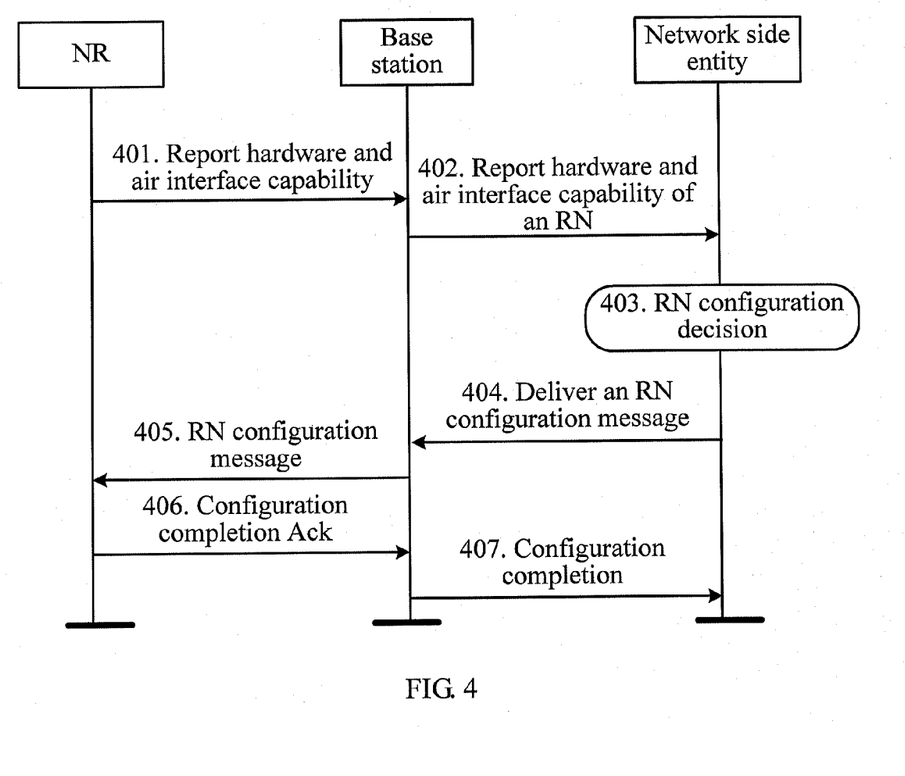
FIG. 4 is a flow chart of an RN attribute configuration process in a method for an RN to access a network according to an embodiment of the present invention.

313: The core network entity configures RN attributes through the eNB according to capability reported by the RN. The process for configuring the RN attributes is shown in FIG. 4.

314: The eNB sends an initial data bearer connection establishment command to the RN to establish an initial data bearer.

315: The RN sends an initial data bearer connection establishment completion message to the eNB as a response.

According to the embodiment of the present invention, in the method for the RN to access the network, the RN accesses the network through the information for identifying the RN, where the information is carried in the network access message. The base station performs information interaction with the core network entity and the RN through the received network access message carrying the RN ID, so that when the RN needs to access the network, the RN can directly access the network through the base station, and at the same time, the information interaction can be performed between the RN waiting for access and the core network entity to complete an RN capability reporting and configuration process.

FIG. 4 shows a process of configuring RN attributes in a method for an RN to access a network according to an embodiment of the present invention. The detailed process of configuring the RN attributes is described as follows:

401: The RN reports hardware and air interface capability information of the RN to an eNB.

402: The eNB forwards the hardware and air interface capability information reported by the RN to a core network entity.

403: The core network entity makes a configuration decision according to the capability information of the RN and an actual network situation.

404: The core network entity delivers an RN configuration message carrying the configuration decision made for the RN to the eNB.

405: The eNB forwards the RN configuration message delivered by the core network entity to the RN for configuration.

406: The RN completes attribute configuration according to the received RN configuration message and sends a configuration completion Ack to the eNB as a response.

407: The eNB sends an RN attribute configuration completion message to the core network entity as a response, so that an RN capability reporting process and a configuration process are completed.

Figure 5A:
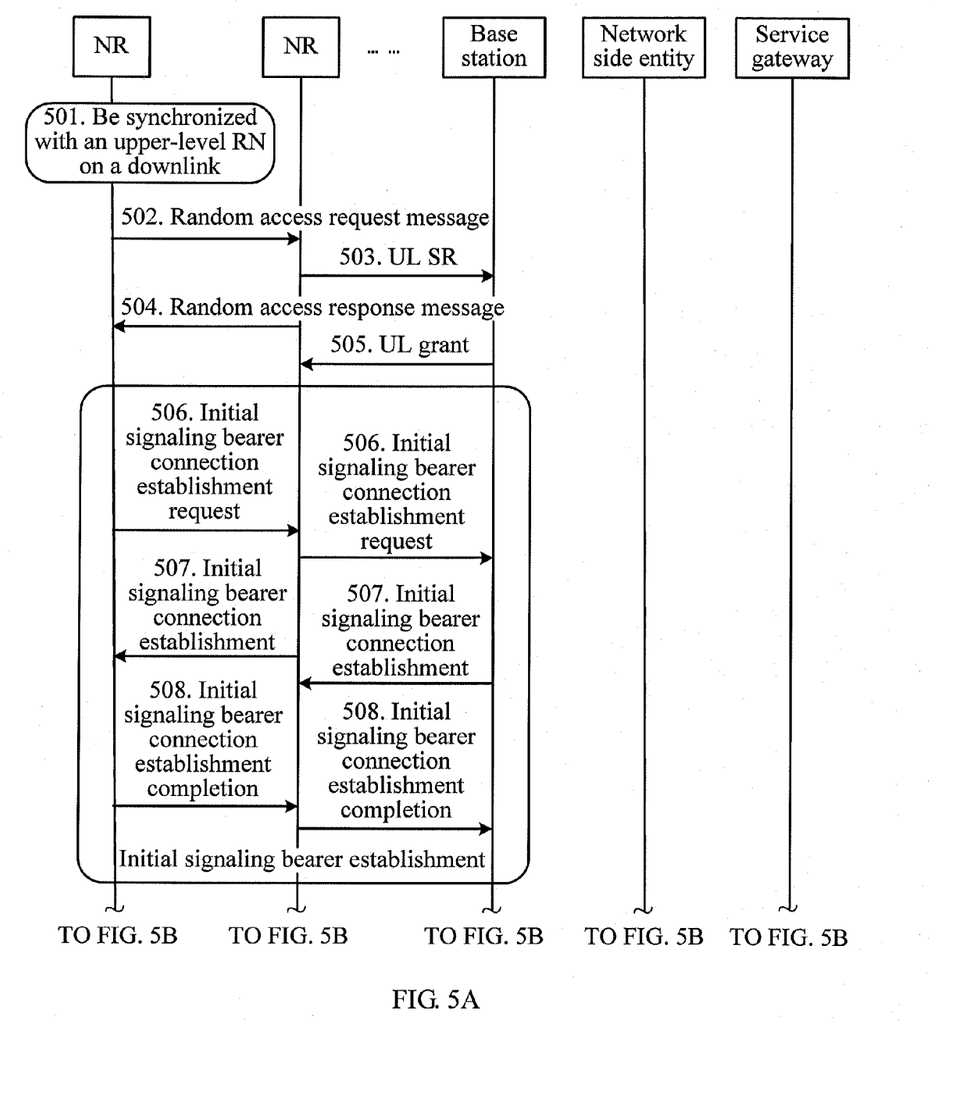
FIG. 5A is a flow chart of a method for an RN to access a network in a distributed manner according to an embodiment of the present invention.
Figure 5B:
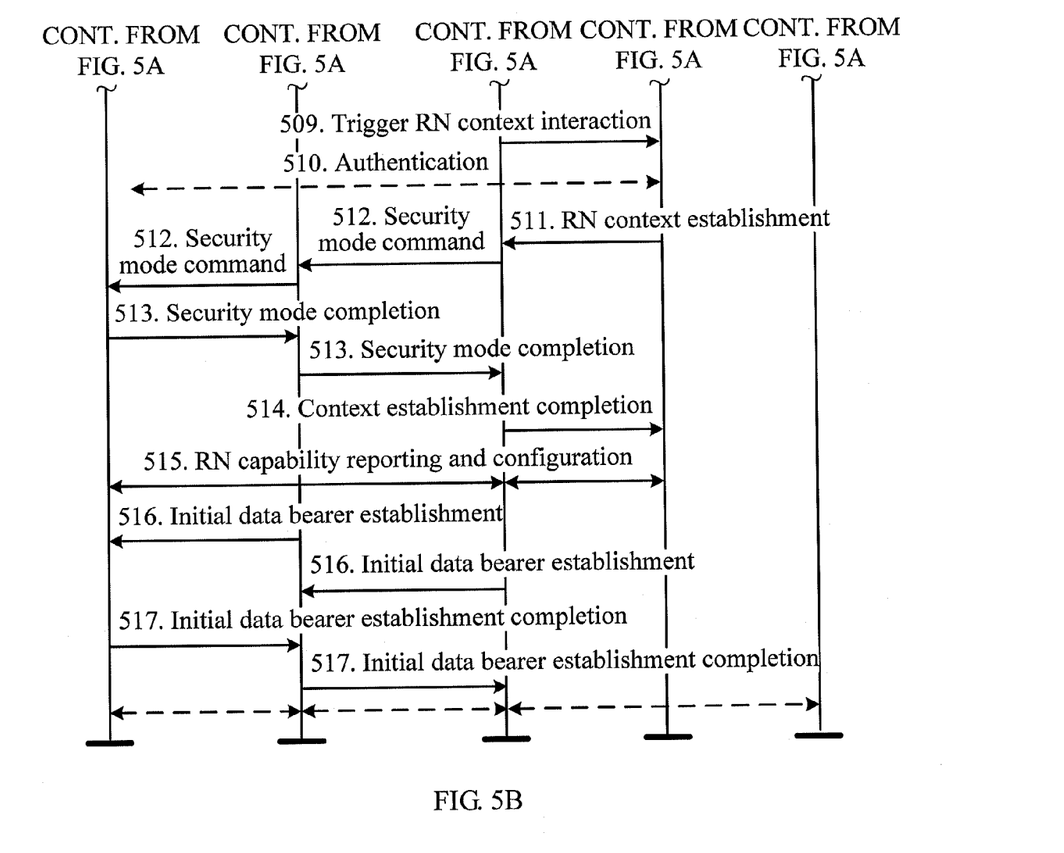
FIG. 5B is an continue flow chart of the method for the RN to access the network in a distributed manner of the FIG. 5A.

FIG. 5 shows a method for an RN to access a network according to an embodiment of the present invention. A process for at least two RNs to access the network in a distributed access manner is taken as an example in the following:

501: When an RN waiting for access needs to access the network, the RN waiting for access and an upper-level RN complete downlink synchronization.

502: The RN waiting for access sends a random access request message including a preamble to the upper-level RN.

In this embodiment, a detailed implementation process for the RN to send the random access request message to an eNB is described in the following.

The RN waiting for access selects a preamble. If a preamble dedicated to the RN is assigned to the RN waiting for access, the preamble is used. If a preamble dedicated to the RN is not assigned to the RN waiting for access, the RN waiting for access selects a group in preamble subsets, which is dedicated to the RN, in an internal cell, and then the RN waiting for access sends the selected preamble to the upper-level RN on a PRACH according to a PRACH location read from an eNB system broadcast.

503: After receiving the random access request message from the RN waiting for access, the upper-level RN of the RN waiting for access sends an Uplink Source Require (UL SR) message of a relay link to a further upper-level RN.

For example, the UL SR message of the relay link is forwarded through RNs at many levels until the message reaches the eNB.

504: After receiving the random access request message from the RN waiting for access, the RN sends a random access response message to the RN waiting for access.

For example, the RN waiting for access monitors a PDCCH channel within a window time of one or more TTIs to obtain DL assignment indication. The RN waiting for access receives the random access response message on a PDSCH according to the DL assignment indication. After the RN waiting for access receives the random access response message, the RN waiting for access and the upper-level RN are synchronized on an uplink. The random access response message includes UL grant, indication of sending an RRC connection establishment request message, TA, and a TC-RNTI.

505: After receiving the UL SR message of the relay link from the RN, the eNB feeds back the UL grant for transmitting a next initial signaling bearer connection establishment request signaling to a lower-level RN of the eNB.

For example, the RNs at each level forward the UL grant until the message is sent to the upper-level RN of the RN waiting for access.

506: The RN waiting for access sends an initial signaling bearer connection establishment request message to the upper-level RN of the RN waiting for access according to the UL grant carried in the random access response message received in 504, and the message is forwarded through the RNs at many levels until the message is sent to the eNB.

For example, the initial signaling bearer connection establishment request message carries the TC-RNTI assigned by the eNB for the RN waiting for access and carries a user ID of an NAS. Each time the initial signaling bearer connection establishment request message passes through one RN, the RN establishes a routing table entry for the RN waiting for access until the initial signaling bearer connection establishment request message is sent to the eNB. In addition to the TC-RNTI assigned by the RN to the RN waiting for access and the user ID of an NAS layer in the initial signaling bearer connection establishment request message sent by the RN waiting for access, the initial signaling bearer connection establishment request message also carries an initial signaling bearer connection establishment reason entry and relevant information of the RNs that the message passes through.

For example, if the random access request message in 502 does not include the preamble dedicated to the RN, the initial signaling bearer connection establishment request message may carry an RN ID bit, where the RN ID bit may be used for the eNB to distinguish whether the RN or the UE accesses the network initially.

507: After receiving the initial signaling bearer connection establishment request message from the RN waiting for access, the upper-level RN of the RN waiting for access continues to forward the message to an upper-level RN and sends an initial signaling bearer connection establishment message to the RN waiting for access as a response.

For example, after receiving the initial signaling bearer connection establishment request message sent by the lower-level RN of the eNB, the eNB may establish a routing table entry for the RN waiting for access by using the TC-RNTI of the RN waiting for access carried in the message and the relevant information of the RNs that the message passes through, and send the initial signaling bearer connection establishment message to the lower-level RN as a response.

For example, the eNB may also send the initial signaling bearer connection establishment message to the lower-level RN as the response before the upper-level RN of the RN waiting for access sends the initial signaling bearer connection establishment message to the RN waiting for access as the response, and the sending sequence is not limited.

508: After receiving the initial signaling bearer connection establishment message correctly, the RN waiting for access sends an initial signaling bearer connection establishment completion message to the upper-level RN as a response.

For example, the RN waiting for access upgrades the TC-RNTI to a C-RNTI, that is, the RN waiting for access determines the TC-RNTI as the C-RNTI, and the upper-level RN cannot assign the TC-RNTI to other RN waiting for access.

For 509-517, reference may be made to 307-315, and the details will not be described herein again.

According to the embodiment of the present invention, in the method for the RN to access the network, the RN accesses the network through the RN ID carried in the network access message. The base station performs information interaction with the core network entity and the RN through the received network access message carrying the RN ID, so that when the RN needs to access the network, the RN can directly access the network through the base station, and at the same time, the information interaction can be performed between the RN waiting for access and the core network entity to complete an RN capability reporting and configuration process.

Figure 6:
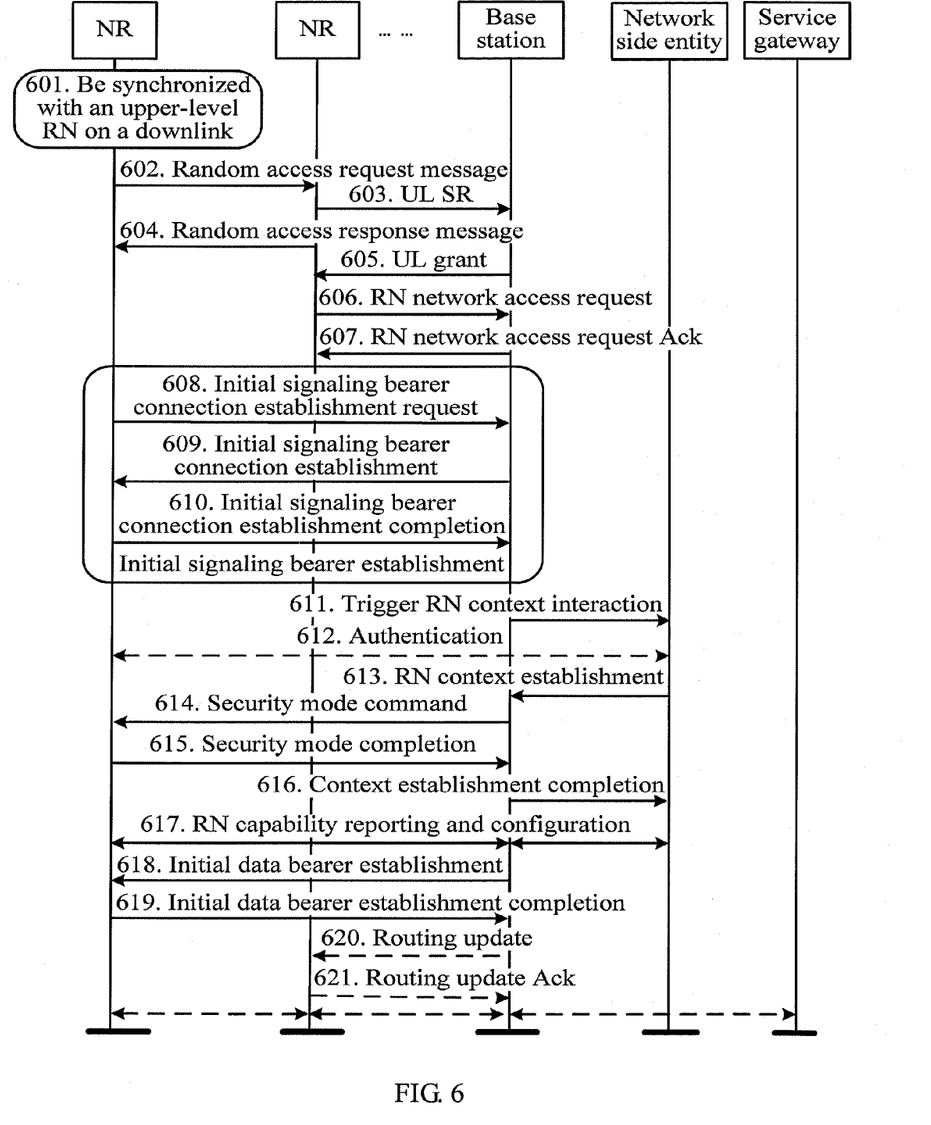
FIG. 6 is a flow chart of a method for an RN to access a network in a centralized manner according to an embodiment of the present invention.

FIG. 6 shows a method for an RN to access a network according to an embodiment of the present invention. A process for at least two RNs to access the network in a centralized access manner is taken as an example in the following:

For 601-605, reference may be made to 501-505 in the embodiment shown in FIG. 5, and the details will not be described herein again.

606: After receiving the random access request of the RN waiting for access, the upper-level RN of the RN waiting for access sends an RN network access request message to the eNB.

607: After receiving the RN network access request message, the eNB delivers an RN network access request Ack message.

In this embodiment, the RN network access request Ack message is used for the eNB to establish a temporary routing table for the RN waiting for access on a relay link according to RN routing information included in the received RN network access request message.

It should be noted that, the RN network access request Ack message may be monitored by all RNs on the relay link. After establishing the temporary routing table for the RN waiting for access according to the routing information of the RN waiting for access carried in the message, each RN delivers the message in turn but does not modify the message.

Differences between 608-610 and 506-508 in the embodiment shown in FIG. 5 are that in this embodiment shown in FIG. 6, the RN at each level, which forwards the initial signaling bearer connection establishment request message, directly forwards the initial signaling bearer connection establishment request message to the upper-level RN without adding relevant information of the RNs that the message passes through, and none of the RNs that the relay link message passes through establishes a routing table entry for a UE.

For 611-619, reference may be made to 509-517 in the embodiment shown in FIG. 5, and the details will not be described herein again.

620: The eNB sends a routing update message to the RN, and the RN establishes a routing table according to the routing update message.

For example, the routing update message may be monitored by all RNs on the relay link and may be delivered in turn, but the RNs on the relay link have no right to modify the message.

621: When the routing update for the RN is completed, the RN returns a routing update Ack to the eNB, and the UE accesses the network successfully.

According to the embodiment of the present invention, in the method for the RN to access the network, the RN accesses the network through the RN ID carried in the network access message. The base station performs information interaction with the core network entity and the RN through the received network access message carrying the RN ID, so that when the RN needs to access the network, the RN can directly access the network through the base station, and at the same time, the information interaction can be performed between the RN waiting for access and the core network entity to complete an RN capability reporting and configuration process.

Figure 7:
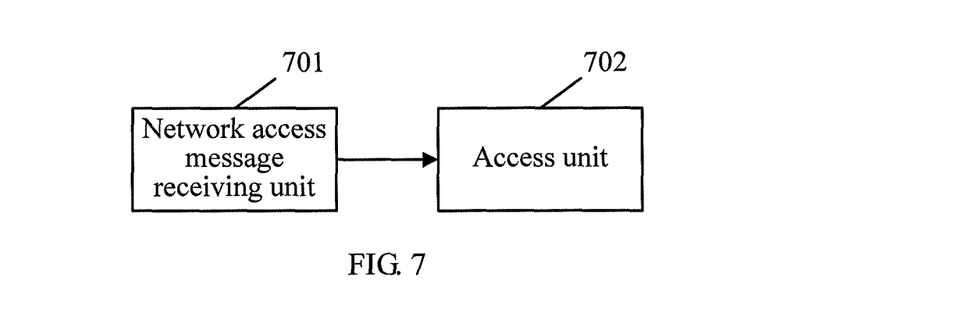
FIG. 7 is a schematic structure diagram of a device for an RN to access a network according to an embodiment of the present invention.

FIG. 7 shows a device for an RN to access a network according to an embodiment of the present invention. The device includes a network access message receiving unit 701 and an access unit 702.

The network access message receiving unit 701 is configured to receive a network access message including information for identifying the RN.

The access unit 702 is configured to enable, according to the information for identifying the RN, an RN waiting for access to access the network.

In another embodiment of the present invention, the access unit 702 includes an information receiving subunit and an information sending subunit.

The information receiving subunit is configured for a base station to receive capability information of the RN reported by the RN, or receive an RN configuration message delivered by a core network entity, or receive a configuration completion Ack message sent by the RN.

The information sending subunit is configured for the base station to send the capability information reported by the RN to the core network entity, or deliver the received RN configuration message to the RN, or send the configuration completion Ack message to the core network entity.

Figure 8:
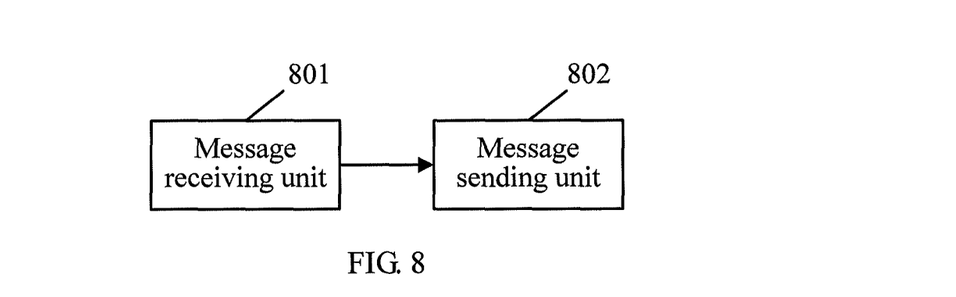
FIG. 8 is a schematic structure diagram of an RN according to an embodiment of the present invention.

FIG. 8 shows an RN according to an embodiment of the present invention. The RN includes a message receiving unit 801 and a message sending unit 802.

The message receiving unit 801 is configured to receive a network access message sent by an RN waiting for access, where the message includes information for identifying the RN.

The message sending unit 802 is configured to send the network access message including the information for identifying the RN to a base station.

In another embodiment of the present invention, the message sending unit includes a routing table establishment subunit and a routing table acknowledgment subunit. In another embodiment of the present invention, the message sending unit includes a temporary routing table establishment subunit and a routing table acknowledgment subunit.

The routing table establishment subunit is configured to establish a routing table entry for the RN waiting for access.

The temporary routing table establishment subunit is configured to receive a network access request Ack message delivered by the base station and establish, according to the network access request Ack message, a temporary routing table.

The routing table acknowledgment subunit is configured to receive a routing update message sent by the base station and establish, according to the update message, a routing table.

According to the device for the RN to access the network provided by the embodiment of the present invention, the RN accesses the network through the information for identifying the RN, where the information is included in the network access message. The base station performs information interaction with the core network entity and the RN through the received network access message including the information for identifying the RN, so that when the RN needs to access the network, the RN can directly access the network through the base station, and at the same time, the information interaction can be performed between the RN waiting for access and the core network entity to complete an RN capability reporting and configuration process.

It can be clearly understood by persons skilled in the art that, for the purpose of convenient and brief description, for a detailed working process of the foregoing system, device and unit, reference may be made to the corresponding process in the method embodiments, and the details will not be described herein again.

In several embodiments provided in the present application, it should be understood that the disclosed system, device, and method may be implemented in other ways. For example, the described device embodiments are merely exemplary. For example, the unit division is merely logical function division and can be other divisions in actual implementation. For example, multiple units or components can be combined or integrated into another system, or some features can be ignored or not performed. Furthermore, the shown or discussed coupling or direct coupling or communication connection may be accomplished through indirect coupling or communication connection between some interfaces, devices or units in an electrical form, a mechanical form, or in other forms.

Units described as separate components may be or may not be physically separated. Components shown as units may be or may not be physical units, that is, may be integrated or distributed to multiple network units. Some or all of the units may be selected to achieve the objective of the solution of the embodiment according to actual requirements.

In addition, various functional units according to each embodiment of the present invention may be integrated in one processing module or may exist as separate physical units, or two or more units may also be integrated in one unit. The integrated module may be implemented through hardware, or may also be implemented in a form of a software functional module.

When the integrated module is implemented in the form of the software functional module and sold or used as a separate product, the integrated module may be stored in a computer readable storage medium. Therefore, the technical solution of the present invention or the part that makes contributions to the prior art can be substantially embodied in the form of a software product. The computer software product is stored in a storage medium, and contains several instructions to instruct computer equipment (such as, a personal computer, a server, or network equipment) to perform all or part of steps of the method as described in the embodiments of the present invention. The storage medium includes various media capable of storing program codes, such as, a flash disk, a mobile hard disk, a Read-Only Memory (ROM), a Random Access Memory (RAM), a magnetic disk or an optical disk.

The above are merely exemplary embodiments of the present invention, but the protection scope of the present invention is not limited herein. Any change or replacement that can be easily figured out by persons skilled in the art within the technical scope disclosed by the present invention shall be covered by the protection scope of the present invention. Therefore, the protection scope of the present invention shall be defined by the claims.

What is claimed is:

1. A method for a relay node (RN) to access a network, comprising:
   receiving by a base station, a network access message comprising information for identifying the RN; and
   enabling the RN to access the network through the base station according to the information for identifying the RN,
   wherein the information for identifying the RN is one of the following: a random access message dedicated to the RN or an initial signaling bearer connection establishment request message, wherein:
      the random access message dedicated to the RN comprises a dedicated preamble which distinguishes the RN from a user equipment (UE), and the dedicated preamble is either assigned to the RN or not assigned to the RN,
         when dedicated preamble is assigned to the RN, the dedicated preamble is sent by the RN to the base station,
         when the dedicated preamble is not assigned to the RN, the RN selects another preamble from a group of RN preamble subsets in an internal cell to dedicate the another preamble to the RN, and the RN then sends the selected another preamble to the base station; and
      the initial signaling bearer connection establishment request message comprises a RN identifier for identifying the RN only, wherein the RN identifier enables the RN to access the network through the base station.

2. The method according to claim 1, wherein the receiving, by the base station, the network access message comprising the information for identifying the RN comprises:
   receiving, by the base station, the network access message forwarded by the RN through an upper-level RN of the RN, wherein the network access message comprises information for identifying the RN.

3. The method according to claim 1, wherein the enabling, according to the information for identifying the RN, the RN to access the network comprises:
   receiving, by an evolved node B (eNB), the random access request message from the RN;
   sending, by the eNB, a random access response message to the RN;
   receiving, by the eNB, an initial signaling bearer connection establishment request message sent by the RN via uplink (UL) grant resources indicated in the random access response message;
   establishing, by the eNB, a temporary routing table entry for the RN by using a temporary cell-radio network temporary ID (TC-RNTI) of the RN carried in the initial signaling bearer connection establishment request message;
   sending, by the eNB, the initial signaling bearer connection establishment message to the RN as a response;
   receiving, by the eNB, an initial signaling bearer connection establishment completion message;
   updating, by the eNB, a routing table entry of the RN; and
   establishing an initial data bearer between the eNB and the RN after security authentication is performed between the RN and the core network entity.

4. The method according to claim 1, wherein the enabling the RN to access the network comprises:
   receiving, by the base station, capability information of the RN reported by the RN;
   sending, by the base station, the capability information of the RN to a core network entity;
   receiving, by the base station, a RN configuration message delivered by the core network entity;
   delivering, by the base station, the RN configuration message to the RN;
   receiving, by the base station, a configuration completion acknowledgment message sent by the RN; and
   sending, by the base station, the configuration completion acknowledgment message to the core network entity.

5. A method for a relay node (RN) to access a network, comprising:
   sending by an RN, a network access message to a base station, wherein the network access message comprises information for identifying the RN; and
   accessing by the RN, the network through the base station according to the information for identifying the RN,
   wherein the information for identifying the RN is one of the following: a random access message dedicated to the RN or an initial signaling bearer connection establishment request message, wherein:
      the random access message dedicated to the RN comprises a dedicated preamble which distinguishes the RN from a user equipment (UE), and the dedicated preamble is either assigned to the RN or not assigned to the RN,
         when the dedicated preamble is assigned to the RN, the dedicated preamble is sent by the RN to the base station,
         when the dedicated preamble is not assigned to the RN, the RN selects another preamble from a group of RN preamble subsets in an internal cell to dedicate the another preamble to the RN, and the RN then sends the selected another preamble to the base station; and
      the initial signaling bearer connection establishment request message comprises a RN identifier for identifying the RN only, wherein the RN identifier enables the RN to access the network through the base station.

6. The method according to claim 5, wherein the sending, by the RN, the network access message to the base station comprises:
establishing a routing table entry for the RN.

7. The method according to claim 5, wherein the sending, by the RN, the network access message to the base station comprises:
receiving a network access request acknowledgment message delivered by the base station;
establishing, according to the network access request acknowledgment message, a temporary routing table;
receiving a routing update message sent by the base station; and
establishing, according to the routing update message, a routing table.

8. A device for facilitating a relay node (RN) to access a network, comprising:
a network access message receiving unit, configured to receive from the RN, a network access message comprising information for identifying the RN; and
an access unit, configured to enable the RN to access the network according to the information for identifying the RN,
wherein the network access message receiving unit is configured to receive one of the following:
a random access request message comprising a random access message dedicated to the RN, or
an initial signaling bearer connection establishment request message, wherein:
the random access message dedicated to the RN comprises a dedicated preamble which distinguishes the RN from a user equipment (UE), and the dedicated preamble is either assigned to the RN or not assigned to the RN,
when the dedicated preamble is assigned to the RN, the dedicated preamble is sent by the RN to the base station,
when the dedicated preamble is not assigned to the RN, the RN selects another preamble from a group of RN preamble subsets in an internal cell to dedicate the another preamble to the RN, and the RN then sends the selected another preamble to the base station; and
the initial signaling bearer connection establishment request message comprises a RN identifier for identifying the RN only, wherein the RN identifier enables the RN to access the network through the base station.

9. The device according to claim 8, wherein the access unit comprises:
an information receiving subunit, configured to receive capacity information of the RN reported by the RN, or receive an RN configuration message delivered by a core network entity, or receive a configuration completion acknowledgment message sent by the RN; and
an information sending subunit, configured to send the capacity information reported by the RN to the core network entity, or deliver the received RN configuration message to the RN, or send the configuration completion acknowledgment message to the core network entity.

10. A relay node (RN), comprising:
a message receiving unit, configured to receive a network access message sent by an RN, wherein the message comprises information for identifying the RN; and
a message sending unit, configured to send the network access message comprising the information for identifying the RN to a base station, wherein the network access message enables the RN to access the network through the base station,
wherein the information for identifying the RN is one of the following: a random access message dedicated to the RN or an initial signaling bearer connection establishment request message, wherein:
the random access message dedicated to the RN comprises a dedicated preamble which distinguishes the RN from a user equipment (UE), and the dedicated preamble is either assigned to the RN or not assigned to the RN,
when the dedicated preamble is assigned to the RN, the dedicated preamble is sent by the RN to the base station,
when the dedicated preamble is not assigned to the RN, the RN selects another preamble from a group of RN preamble subsets in an internal cell to dedicate the another preamble to the RN, and the RN then sends the selected another preamble to the base station; and
the initial signaling bearer connection establishment request message comprises a RN identifier for identifying the RN only, wherein the RN identifier enables the RN to access the network through the base station.

11. The RN according to claim 10, wherein the message sending unit comprises:
a routing table establishment subunit, configured to establish a routing table entry for the RN.

12. The RN according to claim 10, wherein the message sending unit comprises:
a temporary routing table establishment subunit, configured to receive a network access request acknowledgment message delivered by the base station and establish, according to the network access request acknowledgement message, a temporary routing table; and a routing table acknowledgment subunit, configured to receive a routing update message sent by the base station and establish, according to the update message, a routing table.

13. A relay node (RN), comprising:
a first unit, configured to send a network access message to a base station, wherein the network access message comprises information for identifying the RN; and
a second unit, configured to access the network through the base station according to the information for identifying the RN,
wherein the information for identifying the RN is one of the following: a random access message dedicated to the RN or an initial signaling bearer connection establishment request message, wherein:
the random access message dedicated to the RN comprises a dedicated preamble which distinguishes the RN from a user equipment (UE), and the dedicated preamble is either assigned to the RN or not assigned to the RN,
when the random dedicated preamble is assigned to the RN, the dedicated preamble is sent by the RN to the base station,
when the dedicated preamble is not assigned to the RN, the RN selects another preamble from a group of RN preamble subsets in an internal cell to dedicate the another preamble to the RN, and the RN then sends the selected another preamble to the base station; and
the initial signaling bearer connection establishment request message comprises a RN identifier for identifying the RN only, wherein the RN identifier enables the RN to directly access the network through the base station.

14. The RN according to claim 13, wherein:
the first unit configured to send a network access message to a base station is configured to establish a routing table entry for the RN; or
the second unit configured to send a network access message to a base station unit is configured to receive a network access request acknowledgment message delivered by the base station and establish, according to the network access request acknowledgment message, a temporary routing table, and receive a routing update message sent by the base station and establish, according to the routing update message, a routing table.

15. A communication system, comprising:
a base station, configured to receive from a relay node (RN), a network access message comprising information for identifying the relay node (RN) and enable the RN to access the network according to the information for identifying the RN;
wherein the information for identifying the RN is one of the following: a random access message dedicated to the RN or an initial signaling bearer connection establishment request message, wherein:
the random access message dedicated to the RN comprises a dedicated preamble which distinguishes the RN from a user equipment (UE), and the dedicated preamble is either assigned to the RN or not assigned to the RN,
when the dedicated preamble is assigned to the RN, the dedicated preamble is sent by the RN to the base station,
when the dedicated preamble is not assigned to the RN, the RN selects another preamble from a group of RN preamble subsets in an internal cell to dedicate the another preamble to the RN, and the RN then sends the selected another preamble to the base station; and
the initial signaling bearer connection establishment request message comprises a RN identifier for identifying the RN only, wherein the RN identifier enables the RN to access the network through the base station;
wherein the base station is configured to send a random access response message to the RN after receiving the dedicated preamble from the RN, the random access response message comprises uplink grant (UL Grant), indication of an initial signaling bearer establishment request message, uplink timing advance (TA), and a Temporary Cell-Radio Network Temporary Identifier (TC-RNTI) assigned to the RN.

16. The system according to claim 15, further comprising:
an upper-level RN of the RN, wherein the RN forwards the network access message to the base station through the upper-level RN of the RN.

17. A method for a relay node (RN) to access a network, comprising:
receiving by a base station, a network access message comprising information for identifying the RN; and
enabling the RN to access the network through the base station according to the information for identifying the RN,
wherein the information for identifying the RN is one of the following: a random access message dedicated to the RN or an initial signaling bearer connection establishment request message, wherein:
the random access message dedicated to the RN comprises a dedicated preamble which distinguishes the RN from a user equipment (UE), and
the initial signaling bearer connection establishment request message comprises a RN identifier for identifying the RN only, wherein the RN identifier enables the RN to access the network through the base station.

* * * * *

UNITED STATES PATENT AND TRADEMARK OFFICE
CERTIFICATE OF CORRECTION

| | | |
|---|---|---|
| PATENT NO. | : 8,625,480 B2 | Page 1 of 1 |
| APPLICATION NO. | : 13/225072 | |
| DATED | : January 7, 2014 | |
| INVENTOR(S) | : Sun et al. | |

It is certified that error appears in the above-identified patent and that said Letters Patent is hereby corrected as shown below:

In the Claims

Column 14, claim 13, line 57, before "dedicated preamble is assigned" delete "random".

Signed and Sealed this
Twentieth Day of May, 2014

Michelle K. Lee
*Deputy Director of the United States Patent and Trademark Office*